(12) United States Patent
Hatano (10) Patent No.: US 11,984,784 B2
(45) Date of Patent: May 14, 2024

(54) VIBRATION MOTOR WITH MOVING PART AND BUFFER MATERIAL

(71) Applicant: NIDEC SANKYO CORPORATION, Nagano (JP)

(72) Inventor: Shinji Hatano, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 89 days.

(21) Appl. No.: 17/727,819

(22) Filed: Apr. 25, 2022

(65) Prior Publication Data

US 2022/0352802 A1 Nov. 3, 2022

(30) Foreign Application Priority Data

Apr. 28, 2021 (JP) ................................. 2021-076063

(51) Int. Cl.
*H02K 33/02* (2006.01)

(52) U.S. Cl.
CPC ................................... *H02K 33/02* (2013.01)

(58) Field of Classification Search
CPC ........ H02K 33/00; H02K 33/02; H02K 33/04; H02K 33/06; H02K 33/08; H02K 33/10; H02N 1/00; H02N 1/002; H02N 1/04; F16F 15/08
USPC ........................................ 310/28, 29, 15, 25
See application file for complete search history.

(56) References Cited

U.S. PATENT DOCUMENTS

| | | | | |
|---|---|---|---|---|
| 8,258,657 B2* | 9/2012 | Kim | ....................... | H02K 15/02 |
| | | | | 310/28 |
| 8,410,642 B2* | 4/2013 | Dong | ..................... | H02K 33/16 |
| | | | | 310/28 |
| 9,614,425 B2* | 4/2017 | Jin | ......................... | H02K 33/12 |
| 10,307,791 B2* | 6/2019 | Xu | .......................... | B06B 1/045 |
| 10,328,461 B2* | 6/2019 | Xu | .......................... | B06B 1/045 |
| 10,486,196 B2* | 11/2019 | Chai | ....................... | B06B 1/045 |
| 10,491,090 B2* | 11/2019 | Zu | .......................... | H02K 33/16 |
| 10,596,594 B2* | 3/2020 | Ling | ....................... | H02K 33/02 |
| 10,674,278 B2* | 6/2020 | Zhou | ..................... | H04R 9/025 |
| 10,763,732 B2* | 9/2020 | Liu | ........................ | H02K 33/18 |
| 11,050,334 B2* | 6/2021 | Mori | ..................... | H02K 33/18 |
| 11,211,857 B2* | 12/2021 | Ling | ........................ | H02K 5/04 |
| 11,404,948 B2* | 8/2022 | Liu | ........................ | H02K 33/16 |
| 11,515,774 B2* | 11/2022 | Yan | ........................ | H02K 33/16 |

(Continued)

FOREIGN PATENT DOCUMENTS

JP 2020102901 7/2020

*Primary Examiner* — Maged M Almawri
(74) *Attorney, Agent, or Firm* — JCIPRNET (57) ABSTRACT

The actuator includes a movable body, a support body with a case that accommodates the movable body and a coil holder, connecting bodies connected to the movable body and the support body, a magnetic drive circuit including a coil and magnets opposed to the coil in a Z direction and causing the movable body to vibrate in an X direction with respect to the support body, and a buffer material fixed to the case and opposed to the movable body in the X direction. When the magnetic drive circuit is driven with a first voltage, the movable body vibrates without colliding with the buffer material. When the magnetic drive circuit is driven with a second voltage, which is larger than the first voltage, the movable body collides with the case through the buffer material, whereby an impulsive force is generated.

5 Claims, 6 Drawing Sheets

(56) References Cited

U.S. PATENT DOCUMENTS

| | | | | |
|---|---|---|---|---|
| 11,626,786 | B2* | 4/2023 | Maeda | H02K 33/02 |
| | | | | 310/29 |
| 11,641,152 | B2* | 5/2023 | Cui | H02K 35/02 |
| | | | | 310/28 |
| 2011/0127858 | A1* | 6/2011 | Park | B06B 1/045 |
| | | | | 310/25 |
| 2011/0156500 | A1* | 6/2011 | Dong | H02K 33/16 |
| | | | | 310/25 |
| 2011/0241451 | A1* | 10/2011 | Park | H02K 33/16 |
| | | | | 310/25 |
| 2012/0187780 | A1* | 7/2012 | Bang | H02K 33/16 |
| | | | | 310/25 |
| 2013/0221767 | A1* | 8/2013 | Akanuma | H02K 33/02 |
| | | | | 310/15 |
| 2016/0181900 | A1* | 6/2016 | Xu | H02K 33/04 |
| | | | | 310/12.27 |
| 2016/0181902 | A1* | 6/2016 | Xu | H02K 33/18 |
| | | | | 310/17 |
| 2017/0244309 | A1* | 8/2017 | Iwakura | H02K 33/02 |
| 2018/0123437 | A1* | 5/2018 | Khoshkava | H02K 1/223 |
| 2018/0358879 | A1* | 12/2018 | Liu | H02K 1/34 |
| 2019/0305658 | A1* | 10/2019 | Mori | H02K 33/12 |
| 2020/0099272 | A1* | 3/2020 | Taguchi | F16F 15/08 |
| 2020/0366177 | A1* | 11/2020 | Maeda | H02K 33/02 |
| 2021/0067021 | A1* | 3/2021 | Maeda | H02K 33/16 |
| 2021/0104943 | A1* | 4/2021 | Kitahara | H02K 33/18 |

* cited by examiner

VIBRATION MOTOR WITH MOVING PART AND BUFFER MATERIAL

CROSS REFERENCE TO RELATED APPLICATION

The present invention claims priority under 35 U.S.C. § 119 to Japanese Application No. 2021-076063 filed Apr. 28, 2021, the entire content of which is incorporated herein by reference.

BACKGROUND

Field of the Invention

At least an embodiment of the present invention relates to an actuator which vibrates a movable body.

Description of the Related Documents

Japanese Patent Laid-Open No. 2020-102901 discloses an actuator that has a movable body including one of magnets and coils and a support body including the other of the magnets and the coils, and that vibrates the movable body with respect to the support body by applying a drive current to the coil. This type of actuator uses an elastic or viscoelastic body as a connecting body which connects the support body and the movable body. When the movable body is vibrated, a reaction force corresponding to the vibration of the movable body is applied to the support body through the connecting body. As a result, a user who touches the support body can feel the vibration.

Conventionally, an actuator that vibrates a movable body is configured so that the movable body does not collide with the support body when it vibrates. In the configuration as above, it is difficult for the user to experience feeling of being hit by an object (hereinafter referred to as an "impulsive force").

At least an embodiment of the present invention provides an actuator that enables the impulsive force to be experienced.

SUMMARY

The actuator of at least an embodiment of the present invention includes a movable body, a support body with a case that accommodates the movable body, a connecting body that is connected to the movable body and the support body, a magnetic drive circuit including a coil and a magnet that is opposed to the coil in a first direction and causing the movable body to vibrate in a second direction that intersects the first direction with respect to the support body, and a buffer material fixed to one of the case and the movable body and is opposed to the other of the case and the movable body in the second direction.

According to at least an embodiment of the present invention, the buffer material is disposed at a position where the movable body and the support body are opposed to each other in the second direction, which is a vibration direction of the movable body. In the configuration as above, when the magnetic drive circuit is driven with a large voltage, the movable body moves rapidly and largely and collides with the buffer material with large acceleration. Therefore, since an impact is applied to the support body through the buffer material, the user can experience the impulsive force (feeling of being hit by an object). Also, since the movable body does not directly collide with the support body, deformation or damage of the support body due to the generation of the impulsive force can be suppressed.

In at least an embodiment of the present invention, the case is made of metal. By configuring as above, since strength of the case is high, deformation or breakage of the case due to the generation of the impulsive force can be suppressed.

In at least an embodiment of the present invention, when a drive voltage of the magnetic drive circuit is a first voltage capable of continuous drive, an amplitude in the second direction of the movable body is a first amplitude, while when the drive voltage of the magnetic drive circuit is a second voltage that causes the coil to burn out in the case of continuous drive, the amplitude in the second direction of the movable body is a second amplitude, and a gap between the movable body and the buffer material is larger than the first amplitude and smaller than the second amplitude. In this way, it is possible to perform two types of operation, that is, to continuously vibrate the movable body without colliding with the buffer material, and to drive the movable body instantaneously so as to generate the impulsive force.

In at least an embodiment of the present invention, the support body includes a coil holder that holds the coil, the coil holder includes a plate portion with a coil placement hole, the movable body includes a yoke that holds the magnet, the yoke includes a first flat-plate portion opposed to the plate portion from one side of the first direction, a second flat-plate portion opposed to the plate portion from the other side of the first direction, and a pair of connecting plate portions disposed on both sides in the second direction of the plate portion, the case includes a pair of side plate portions disposed on both sides in the second direction of the yoke, and the buffer material is fixed to each of the pair of side plate portions. In this way, when the movable body moves in either one of the one side and the other side in the second direction, the movable body collides with the support body through the buffer material. Therefore, the impulsive force can be generated.

In at least an embodiment of the present invention, the coil holder is made of resin, and the gap in the second direction between the coil holder and the yoke is larger than a gap in the second direction between the side plate portion and the connecting plate portion. In this way, when the movable body is moved largely in the second direction, the movable body collides with the side plate portion through the buffer material before colliding with the coil holder. Therefore, deformation or breakage of the coil holder formed of resin by the collision with the movable body can be prevented.

In at least an embodiment of the present invention, the buffer material is made of rubber or a foamed body. By disposing an elastic body such as rubber or a foamed body on a surface with which the movable body collides, breakage or deformation of a collision point can be suppressed. Moreover, the acceleration of the movable body can be damped by elastic resilience of the elastic body.

According to at least an embodiment of the present invention, since the buffer material is disposed at a position where the movable body and the support body are opposed to each other in the second direction, which is the vibration direction of the movable body, when the magnetic drive circuit is driven with a large voltage, the movable body moves rapidly and largely, and collides with the buffer material with large acceleration. Therefore, since an impact is applied to the support body through the buffer material, the user can experience the impulsive force (feeling of being hit by an object). Also, since the movable body does not directly collide with the support body, deformation or damage of the support body due to the generation of the impulsive force can be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An embodiment of an actuator to which at least an embodiment of the present invention is applied will be described below with reference to the drawings.

Overall Configuration

Figure 1:
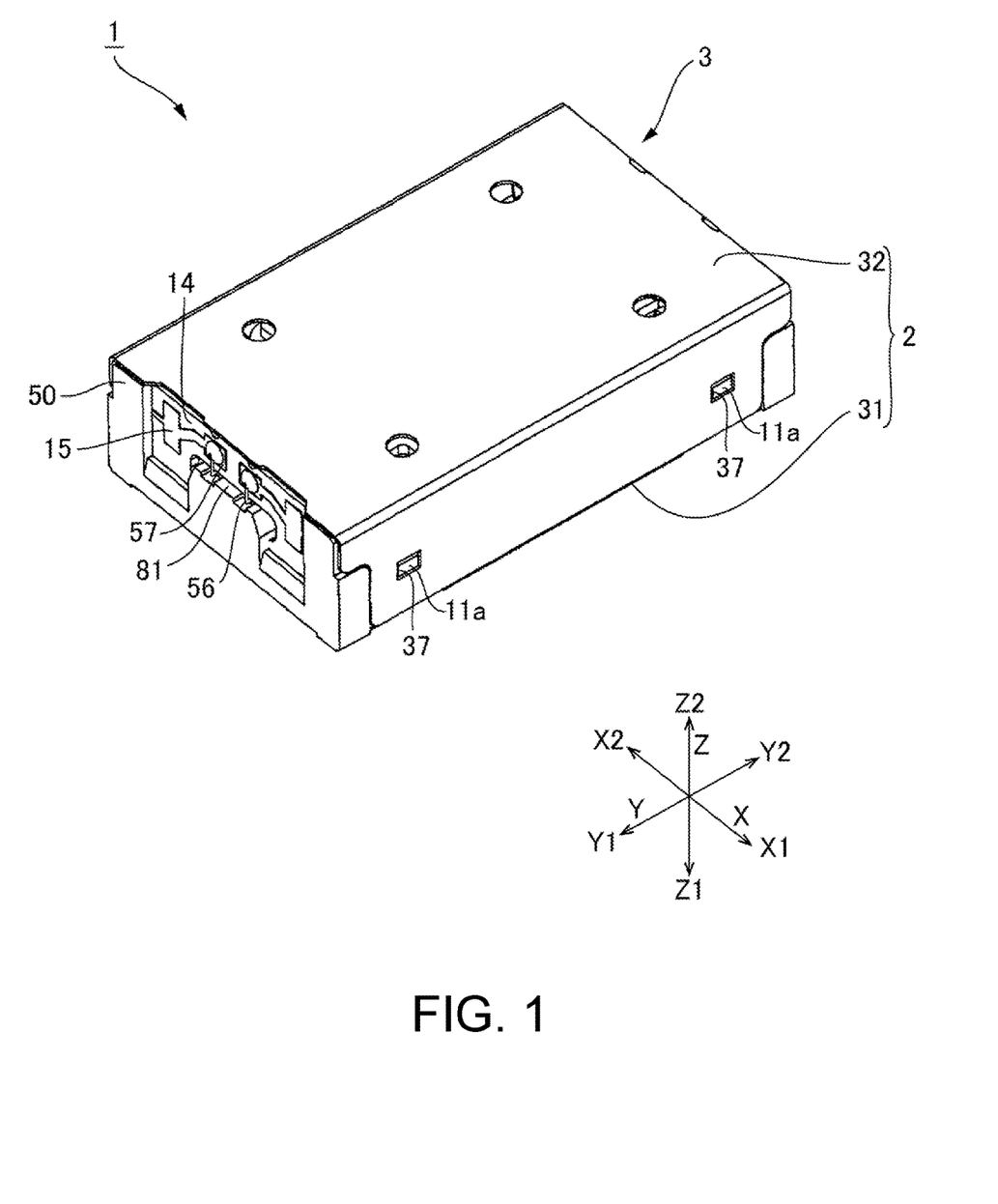
FIG. 1 is a perspective view of an actuator to which at least an embodiment of the present invention is applied.
Figure 2:
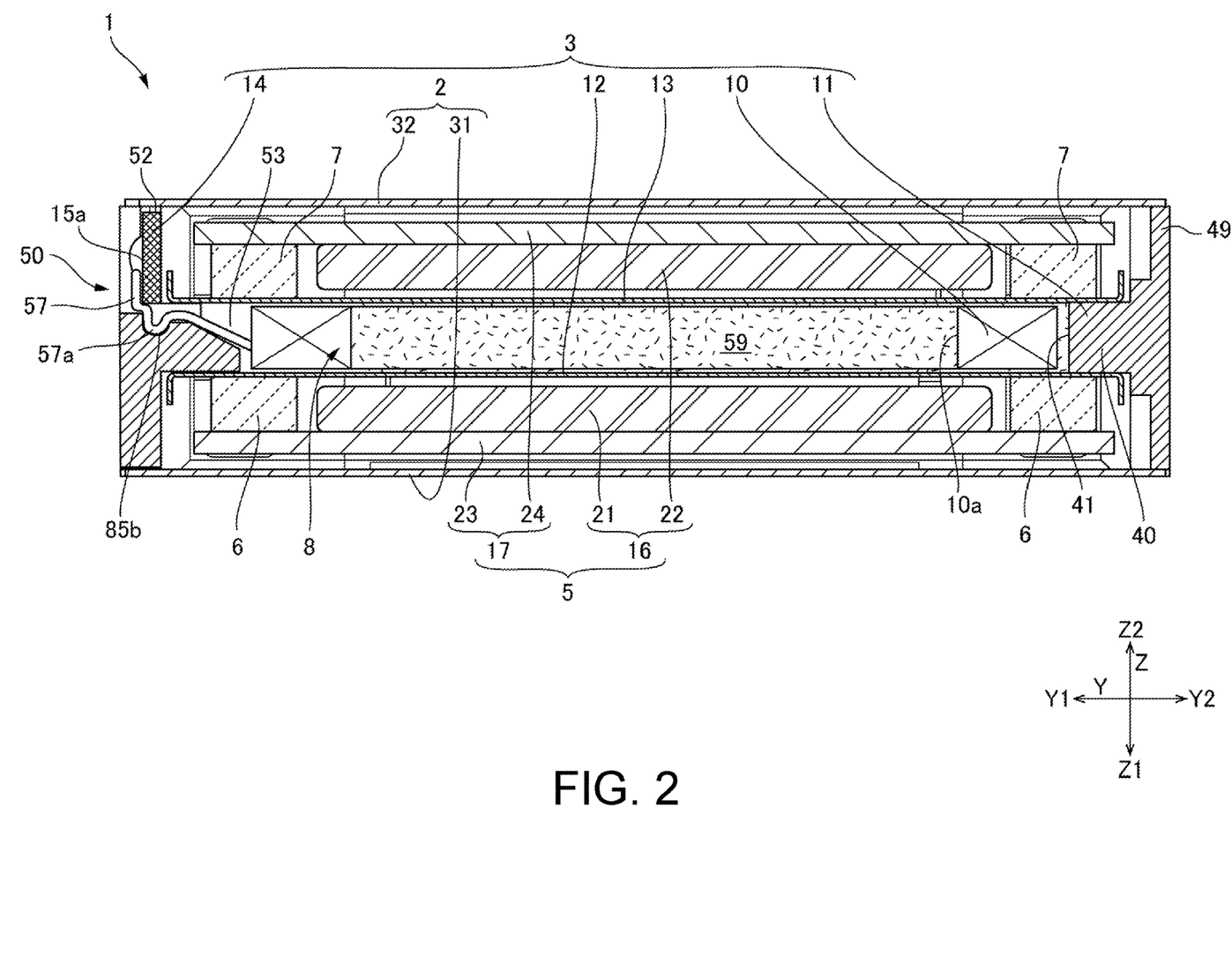
FIG. 2 is a cross-sectional view of the actuator when cut in a longitudinal direction.
Figure 3:
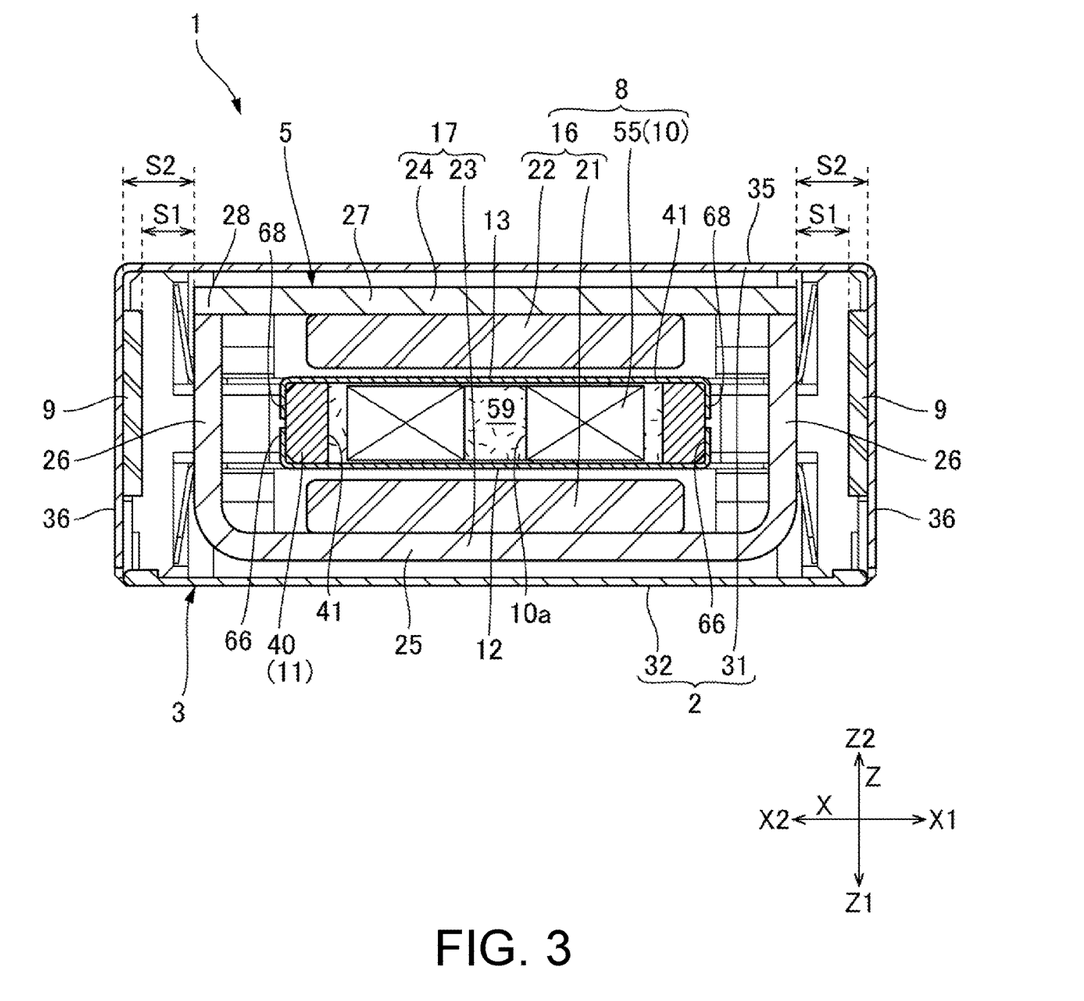
FIG. 3 is a cross-sectional view of the actuator when cut in a direction intersecting the longitudinal direction.
Figure 4:
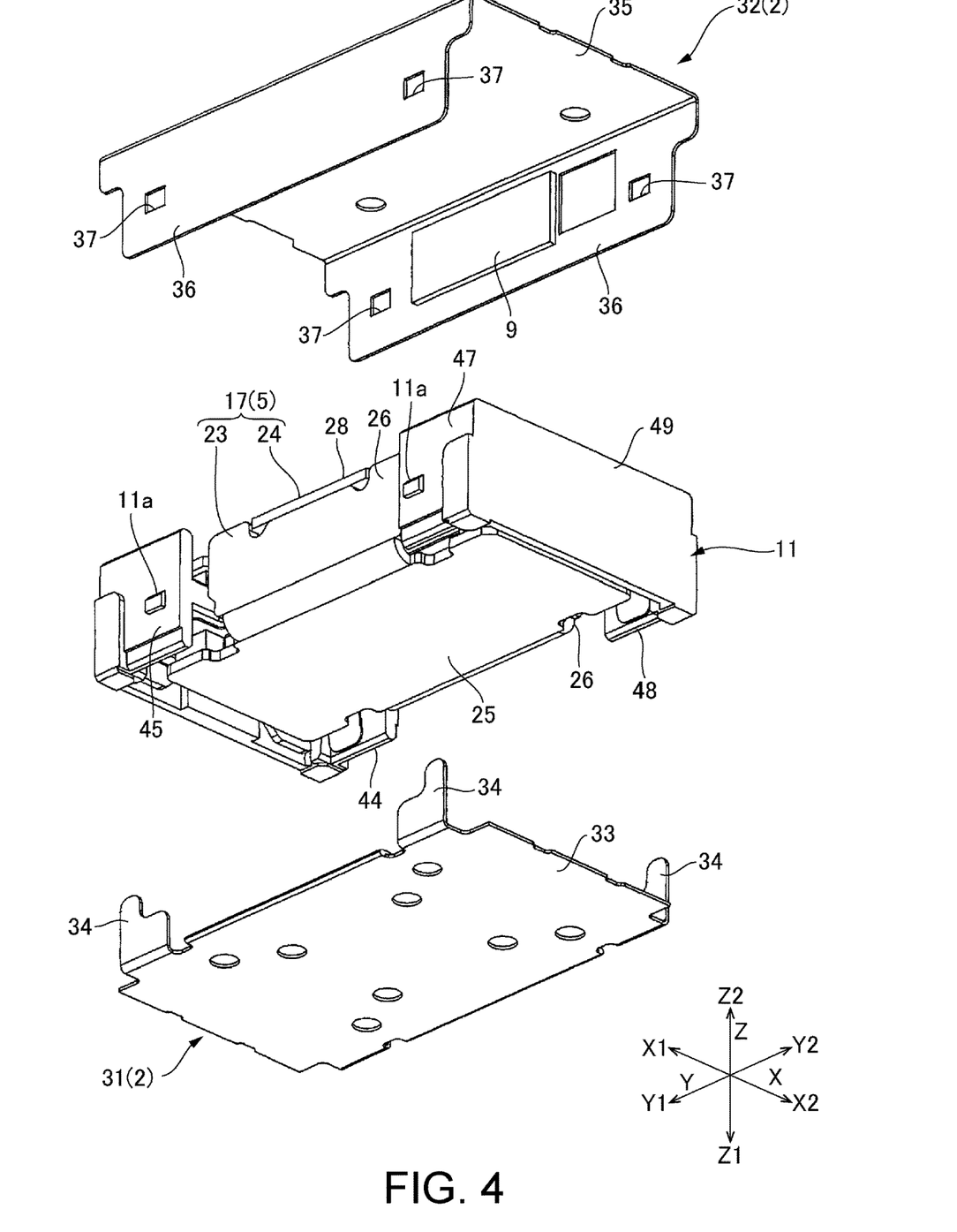
FIG. 4 is an exploded perspective view of the actuator.
Figure 5:
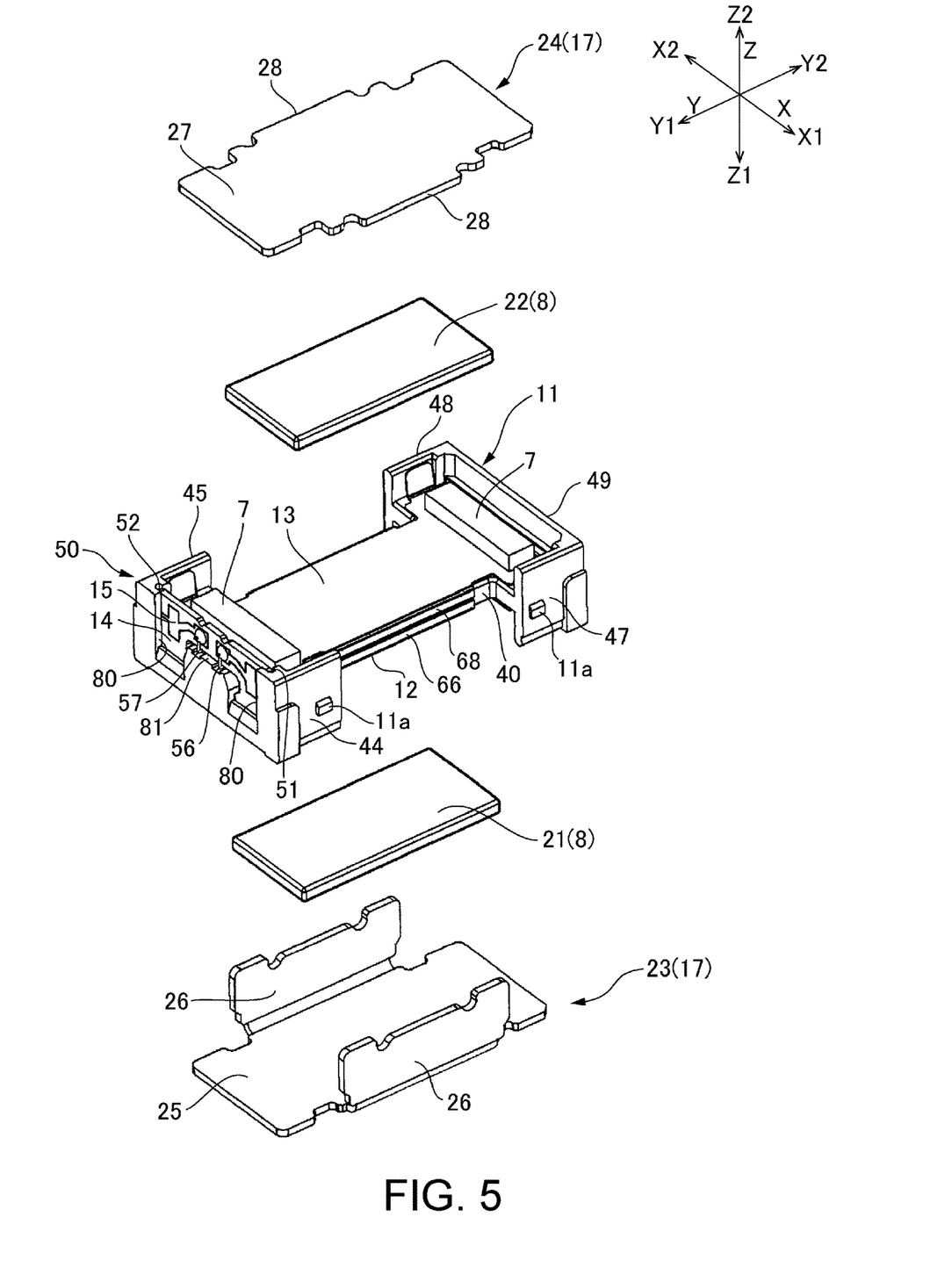
FIG. 5 is an exploded perspective view of the actuator with a case removed.
Figure 6:
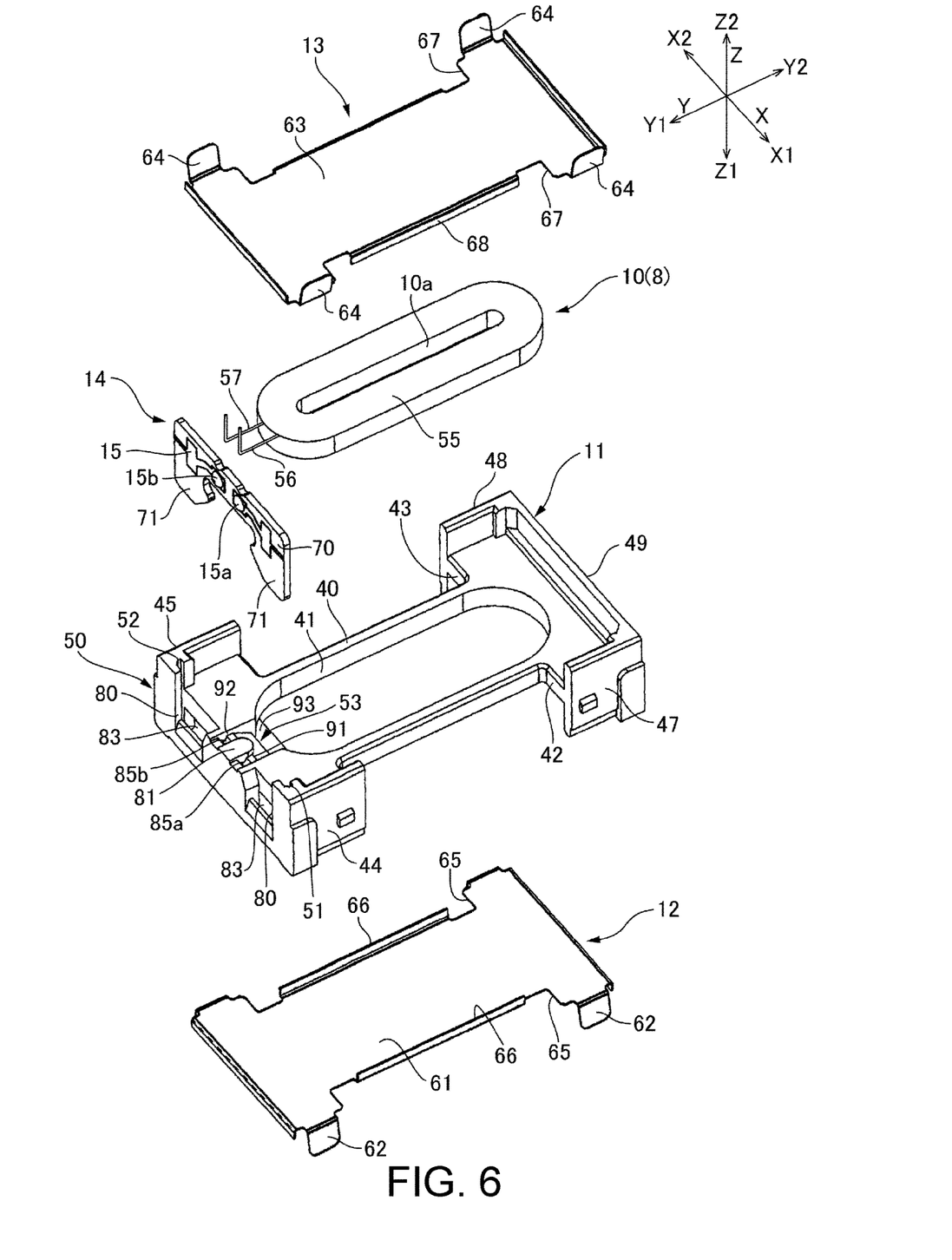
FIG. 6 is an exploded perspective view of a support body with the case removed.

FIG. 1 is a perspective view of an actuator 1 to which at least an embodiment of the present invention is applied. FIG. 2 is a cross-sectional view of the actuator 1 when cut in a longitudinal direction. FIG. 3 is a cross-sectional view of the actuator 1 cut in a direction intersecting the longitudinal direction FIG. 4 is an exploded perspective view of the actuator 1. FIG. 5 is an exploded perspective view of the actuator 1 with a case 2 removed. FIG. 6 is an exploded perspective view of a support body 3 with the case 2 removed.

The actuator 1 is used as a tactile device that transmits information by vibration. As shown in FIG. 1, the actuator 1 has a cuboid-shaped appearance. The actuator 1 generates vibration in a shorter-side direction of its appearance. In the following explanation, it is assumed that the shorter-side direction in which vibration is generated is an X direction (second direction), and a longitudinal direction of the actuator 1 that is perpendicular to the X direction is a Y direction. Moreover, in the following description, a thickness direction of the actuator 1, which is orthogonal to the X and Y directions, is referred to as a Z direction (first direction). The X direction, the Y direction, and the Z direction are orthogonal to each other. Moreover, one side of the X direction is supposed to be an X1 direction and the other side to be an X2 direction. One side of the Y direction is supposed to be a Y1 direction and the other side to be a Y2 direction. One side of the Z direction is supposed to be a Z1 direction and the other side to be a Z2 direction.

As shown in FIGS. 2 and 3, the actuator 1 has a support body 3 including a case 2 that defines the outer shape, and a movable body 5 that is accommodated inside the case 2. The actuator 1 also includes a connecting body 6 and a connecting body 7 that connect the support body 3 and the movable body 5, and a magnetic drive circuit 8 that relatively moves the movable body 5 with respect to the support body 3 in the X direction.

The support body 3 includes a coil 10, a coil holder 11 made of resin to hold the coil 10, a first plate 12 stacked in the Z1 direction of the coil holder 11, and a second plate 13 stacked in the Z2 direction of the coil holder 11. The coil 10 has a winding portion 55 around which a coil wire is wound in an oblong shape, and a first drawn-out portion 56 as well as a second drawn-out portion 57 drawn out of an outer peripheral side of the winding portion 55 in the Y1 direction. The coil 10 has its thickness direction facing the Z direction. As shown in FIGS. 2 and 3, the winding portion 55 of the coil 10 is located at a center in the Z direction of the case 2.

Moreover, as shown in FIGS. 1, 2, and 5, the support body 3 also has a feed substrate 14 held on an end surface in the Y1 direction of the coil holder 11. The first drawn-out portion 56 and the second drawn-out portion 57 of the coil 10 are connected to a first land 15a and a second land 15b of a wiring pattern 15 provided on the surface of the feed substrate 14. Power is supplied to the coil 10 via the feed substrate 14.

The movable body 5 includes a magnet 16 and a yoke 17. The magnet 16 is opposed to the winding portion 55 of the coil 10 in the Z direction. The coil 10 and the magnet 16 constitute the magnetic drive circuit 8. As shown in FIGS. 2 and 4, the connecting body 6 and the connecting body 7 are cuboid-shaped members, respectively. The connecting body 6 and the connecting body 7 have at least one of elasticity and viscoelasticity, respectively.

Movable Body

As shown in FIGS. 2, 3, and 5, the movable body 5 includes a first magnet 21 and a second magnet 22 as magnets 16. The first magnet 21 is located in the Z1 direction of the coil 10. The second magnet 22 is located in the Z2 direction of the coil 10. The first magnet 21 and the second magnet 22 are polarized into two in the X direction.

The yoke 17 is made of a magnetic material. As shown in FIGS. 3 and 4, the yoke 17 is constituted by assembling two members, that is, a first yoke 23 and a second yoke 24. As shown in FIG. 5, the first yoke 23 includes a first flat-plate portion 25 that is long in the Y direction and, on both end edges in the Y direction of the first flat-plate portion 25, a pair of connecting plate portions 26 that are curved in the Z2 direction from a center part in the Y direction toward an outside in the X direction and extending in the Z2 direction. The first magnet 21 is held on the surface in the Z2 direction of the first flat-plate portion 25. The second yoke 24 includes a second flat-plate portion 27 opposed to the first flat-plate portion 25 in the Z direction and a pair of extending portions 28 extending from an intermediate part in the Y direction of the second flat-plate portion 27 to the X1 direction and the other side X2. The second magnet 22 is held on the surface in the Z1 direction of the second flat-plate portion 27. To the pair of extending portions 28 of the second yoke 24, distal end parts in the Z2 direction of the pair of connecting plate portions 26 are joined by welding or the like. As a result, the first yoke 23 and the second yoke 24 are integrated and constitute the yoke 17.

Support Body

As shown in FIGS. 1, 3, and 4, the case 2 includes a first case member 31 and a second case member 32 stacked in the Z direction. The first case member 31 is mounted on the coil holder 11 from the Z1 direction. The second case member 32 is mounted on the coil holder 11 from the Z2 direction. As shown in FIG. 4, the first case member 31 includes a rectangular-shaped first plate portion 33 and four side plate portions 34 extending in the Z1 direction from both end edges in the X direction of an end portion in the Y1 direction of the first plate portion 33 and from both end edges in the X direction of the end portion in the Y2 direction of the first plate portion 33. The four side plate portions 34 are located on both sides in the X direction of the coil holder 11.

The second case member 32 includes a rectangular-shaped second plate portion 35 and a pair of side plate portions 36 extending in the Z2 direction from both end edges in the X direction of the second plate portion 35. The pair of side plate portions 36 are located on both sides in the X direction of the coil holder 11. The pair of side plate portions 36 include lock holes 37 with which locking protruding portions 11a formed on the side surfaces on both sides in the X direction of the coil holder 11 are fitted.

As shown in FIG. 6, the coil holder 11 includes a plate portion 40 extending in the Y direction. A coil placement hole 41 is provided at the center of the plate portion 40. The coil placement hole 41 is an oblong through hole that is long in the Y direction. The coil placement hole 41 accommodates the winding portion 55 of the coil 10. The coil holder 11 also includes notch portions 42 and 43 that are notched inward at the center part in the Y direction at the end edges on both sides in the X direction of the plate portion 40.

Moreover, the coil holder 11 includes, in the Y1 direction of the notch portions 42 and 43, a side plate portion 44 that protrudes in the Z1 direction and the Z2 direction from the edge in the X1 direction of the plate portion 40 and a side plate portion 45 that protrudes in the Z1 direction and the Z2 direction from the edge in the X2 direction of the plate portion 40. In addition, the coil holder 11 includes a substrate support portion 50 provided on an end portion in the Y1 direction of the plate portion 40.

In addition, the coil holder 11 includes, in the Y2 direction of the notch portions 42 and 43, a side plate portion 47 that protrudes in the Z1 direction and the Z2 direction from the edge in the X1 direction of the plate portion 40, a side plate portion 48 that protrudes in the Z1 direction and the Z2 direction from the edge in the X2 direction of the plate portion 40, and a side plate portion 49 that protrudes in the Z1 direction and the Z2 direction from the end edge in the Y2 direction of the plate portion 40. The side plate portion 49 connects an end in the Y2 direction of the side plate portion 47 and an end in the Y2 direction of the side plate portion 48.

As shown in FIG. 6, the feed substrate 14 has a rectangular-shaped wiring connection portion 70 that is long in the X direction when viewed from the Y direction and a pair of leg portions 71 protruding in the Z1 direction from both end portions in the X direction in the wiring connection portion 70. The wiring pattern 15 including a first land 15a and a second land 15b is formed in the wiring connection portion 70. As shown in FIG. 5, the feed substrate 14 is supported by a substrate support portion 50 in a posture in which a surface on which the first land 15a and the second land 15b are formed is directed to the Y1 direction.

As shown in FIG. 6, the substrate support portion 50 has a pair of slits 51 and 52 opposed to each other in the X direction. The substrate support portion 50 includes a protruding portion 81 provided at the center part in the X direction of the end portion in the Y1 direction of the plate portion 40, a pair of notched recess portions 80 provided on both sides in the X direction of the protruding portion 81, and a substrate insertion hole 83 provided on an inner wall surface in the Z1 direction of each of the notched recess portions 80.

As shown in FIG. 5, the feed substrate 14 is supported by the substrate support portion 50 with each of the both end edges in the X direction inserted into the slits 51 and 52 from the Z2 direction. At this time, the protruding portion 81 provided between the pair of notched recess portions 80 in the plate portion 40 is press-fitted between the pair of leg portions 71 of the feed substrate 14, and the distal end portion of each leg portion 71 of the feed substrate 14 is inserted into the pair of substrate insertion holes 83.

Moreover, the coil holder 11 includes a guide groove 53 that extends from the coil placement hole 41 toward the substrate support portion 50 on the surface in the Z2 direction of the plate portion 40. As shown in FIG. 6, the guide groove 53 includes a common groove portion 93 that communicates with the coil placement hole 41 and groove portions 91 and 92 that extend in the Y1 direction from both ends in the X direction of the common groove portion 93. The first drawn-out portion 56 and the second drawn-out portion 57 which are pulled out in the Y1 direction from the winding portion 55 of the coil 10 are routed through the guide groove 53 and are connected to the feed substrate 14. As shown in FIG. 4, the first drawn-out portion 56 and the second drawn-out portion 57 are pulled out in an inclined direction in the common groove portion 93 and bent in the Z2 direction in recess portions 85a and 85b provided in the groove portions 91 and 92 of the guide groove 53 and then, they extend in the Z2 direction along the surface of the feed substrate 14 and are connected to the first land 15a and the second land 15b.

The first plate 12 and the second plate 13 are made of a non-magnetic material. As shown in FIG. 6, the first plate 12 has a rectangular first plane portion 61 covering the plate portion 40 from the Z1 direction and a plurality of first claw portions 62 protruding diagonally in the Z1 direction from both sides in the X direction of the first plane portion 61 toward an outside in the X direction. When the first plate 12 contacts the plate portion 40 of the coil holder 11 from the Z1 direction, the first claw portion 62 is brought into an elastic contact state with the side plate portion 44, the side plate portion 45, the side plate portion 47, and the side plate portion 48.

The second plate 13 has a rectangular second plane portion 63 covering the plate portion 40 from the Z2 direction and a plurality of second claw portions 64 protruding diagonally in the Z2 direction from both sides in the X direction of the second plane portion 63 toward the outside in the X direction. When the second plate 13 contacts the plate portion 40 of the coil holder 11 from the Z2 direction, the second claw portion 64 is brought into the elastic contact state with the side plate portion 44, the side plate portion 45, the side plate portion 47, and the side plate portion 48.

When the coil 10 is to be fixed to the coil holder 11, the first plate 12 is stacked on the plate portion 40 of the coil holder 11 from the Z1 direction. As a result, the first plate 12 is supported by the coil holder 11 with the coil placement hole 41 blocked from the Z1 direction. Next, the winding portion 55 of the coil 10 is disposed in the coil placement hole 41, and an adhesive is filled in a center hole 10a of the winding portion 55.

Then, the second plate 13 is stacked on the plate portion 40 of the coil holder 11 from the Z2 direction so as to be supported on the coil holder 11. The first plate 12 and the second plate 13 are fixed to the plate portion 40 of the coil holder 11 by an adhesive layer 59, which is a cured adhesive. Moreover, the adhesive flows into a space between the inner wall surface of the coil placement hole 41 and the winding portion 55 and is cured. As a result, the winding portion 55 is fixed to the inner wall surface of the coil placement hole 41.

As shown in FIG. 6, the first plate 12 includes a pair of notch portions 65 notched inward at the center part in the Y direction on end edges on the both sides in the X direction of the first plane portion 61, and the first claw portions 62 are provided on both sides in the Y direction of each of the notch portions 65, respectively. Moreover, the first plate 12 includes a pair of bent plate portions 66 bent to the Z2 direction from the inner edges in the X direction of the pair of notch portions 65. As shown in FIG. 3, the pair of bent plate portions 66 cover end surfaces on the both sides in the X direction of the plate portion 40 of the coil holder 11.

Similarly, the second plate 13 includes a pair of notch portions 67 notched inward at the center part in the Y direction on end edges on the both sides in the X direction of the second plane portion 63, and the second claw portions 64 are provided on both sides in the Y direction of each of the notch portions 67, respectively. Moreover, the second plate 13 includes a pair of bent plate portions 68 bent to the Z2 direction from the inner peripheral edges in the X direction of the pair of notch portions 67. As shown in FIG. 3, the pair of bent plate portions 68 cover end surfaces on the both sides in the X direction of the plate portion 40 of the coil holder 11.

Connecting Body

As shown in FIG. 2, the connecting body 6 is disposed between the first yoke 23 and the first plate 12. In more detail, the connecting body 6 is composed of two members of the same shape, and is sandwiched at two spot, that is, between the end portion in the Y1 direction of the first yoke 23 and the end portion in the Y1 direction of the first plate 12 and between the end portion in the Y2 direction of the first yoke 23 and the end portion in the Y2 direction of the first plate 12. In this embodiment, the connecting body 6 has a cuboid shape extending long in the X direction and has the same shape as that of the connecting body 7 shown in FIG. 5.

The connecting body 7 is disposed between the second yoke 24 and the second plate 13. In more detail, the connecting body 7 is composed of two members of the same shape, and is sandwiched at two spots, that is, between the end portion in the Y1 direction of the second yoke 24 and the end portion in the Y1 direction of the second plate 13 and between the end portion in the Y2 direction of the second yoke 24 and the end portion in the Y2 direction of the second plate 13. The connecting body 6 and the connecting body 7 are compressed in the Z direction between the support body 3 and the movable body 5.

The connecting bodies 6 and 7 are gel-like members made of silicone gel. Silicone gel is a viscoelastic body whose spring constant when deformed in a stretch direction is approximately three times greater than its spring constant when deformed in a shear direction. When the viscoelastic body is deformed in the direction (shear direction) that intersects a thickness direction, the deformation is in a direction that it is pulled and stretched and thus, it has such a deformation characteristic that a linear component is larger than a nonlinear component. It has such stretching characteristics that the nonlinear component is larger than the linear component, when it is pressed and is compressed and deformed in the thickness direction, while the linear component is larger than the nonlinear component, when it is pulled and stretched in the thickness direction.

Alternatively, natural rubber, diene rubber (styrene butadiene rubber, isoprene rubber, butadiene rubber, chloroprene rubber, acrylonitrile butadiene rubber and the like, for example), non-diene rubber (butyl rubber, ethylene-propylene rubber, ethylene-propylene-diene rubber, urethane rubber, silicone rubber, fluororubber and the like, for example), thermoplastic elastomers, and various other rubber materials and their modified materials may be used as the connecting bodies 6 and 7.

Buffer Material

As shown in FIG. 3, in a state where the movable body 5 is supported by the support body 3 through the connecting bodies 6 and 7, the pair of connecting plate portions 26 of the yoke 17 are located inside the notch portions 42 and 43 (see FIG. 6) of the coil holder 11. As shown in FIGS. 3 and 4, the pair of connecting plate portions 26 constitute the side surfaces in the X direction of the movable body 5. Here, in the support body 3, the second case member 32 includes a pair of side plate portions 36 disposed on both sides in the X direction of the yoke 17, and each of the pair of side plate portions 36 is opposed to the connecting plate portion 26 that constitutes the side surface in the X-direction of the yoke 17 in the X direction.

As shown in FIGS. 3 and 4, a buffer material 9 is fixed to each of the pair of side plate portions 36. As shown in FIG. 3, the buffer material 9 that is fixed to the side plate portion 36 in the X1 direction is opposed to the connecting plate portion 26 that constitutes the side surface in the X1 direction of the yoke 17 in the X direction (second direction). Moreover, the buffer material 9 that is fixed to the side plate portion 36 in the X2 direction is opposed to the connecting plate portion 26 in the X direction (second direction) that constitutes the side surface in the X2 direction of the yoke 17. The buffer material 9 is rectangular and has a constant thickness in the X direction.

The buffer material 9 is made of an elastic or viscoelastic material such as rubber. Alternatively, an elastic material made of a foamed body such as urethane foam, sponge and the like may be used as the buffer material 9. For example, Poron (registered trademark) can be used as the buffer material 9.

Operation of Actuator

In a state where the movable body 5 is supported by the support body 3 through the connecting bodies 6 and 7, the winding portion 55 of the coil 10 held by the plate portion 40 of the coil holder 11 is opposed to the first magnet 21 through the first plate 12 in the Z1 direction and is opposed to the second magnet 22 through the second plate 13 in the Z2 direction as shown in FIG. 3. This constitutes the magnetic drive circuit 8.

When a current in a predetermined direction is supplied to the coil 10 via the feed substrate 14, the movable body 5 supported by the support body 3 moves relative to the support body 3 in one of the X direction by the driving force of the magnetic drive circuit 8. Then, when the direction of the electric current is reversed, the movable body 5 moves relative to the support body 3 in the other of the X direction. The repeated reversal of the direction of the current supplied to the coil 10 vibrates the movable body 5.

A drive voltage of the magnetic drive circuit 8 is controlled by a control device, not shown. The control device drives the magnetic drive circuit 8 in two different drive modes, that is, a first drive mode and a second drive mode.

In the first drive mode, the coil 10 is energized with a drive waveform that alternately reverses the direction of the current flowing in the coil 10 with a predetermined cycle. The drive voltage in the first drive mode is a first voltage that does not cause burnout of the coil 10 even when it is continuously energized. Assuming that the amplitude of the movable body 5 in the first drive mode is a first amplitude W1, the first amplitude W1 is smaller than a gap S1 (see FIG. 3) in the X direction between the buffer material 9 fixed to the side plate portion 36 of the case 2 and the connecting plate portion 26 of the yoke 17. Therefore, the movable body 5 vibrates continuously without colliding with the buffer material 9.

On the other hand, in the second drive mode, a single drive waveform is used to energize the coil 10 for a short time at a second voltage higher than the first voltage. The second voltage is a voltage at which the coil 10 will be heated and burnt out if it is continuously energized for a long time. Assuming that a moving amount (amplitude) in the X direction of the movable body 5 when the coil 10 is energized with a drive waveform in the second drive mode is a second amplitude W2, the second amplitude W2 is larger than the first amplitude W1 and is larger than a gap S2 (see FIG. 3) in the X direction between the side plate portion 36 and the connecting plate portion 26. Therefore, in the second drive mode, the movable body 5 collides with the buffer material 9, causing the buffer material 9 to be compressed and deformed, and the movable body 5 collides with the side plate portion 36 through the buffer material 9. This allows the user to experience the impulsive force (feeling of being hit by the object).

Here, the second amplitude W2 may have such a dimension that is larger than the gap S1 between the buffer material 9 and the connecting plate portion 26 and smaller than the gap S2 between the side plate portion 36 and the connecting plate portion 26. Even with such an amplitude, a predetermined impact is applied to the side plate portion 36 through the buffer material 9. Therefore, this allows the user to experience the impulsive force (feeling of being hit by the object).

In this embodiment, the yoke 17 is opposed to the coil holder 11 made of resin in the X direction, and the gap in the X direction between the yoke 17 and the coil holder 11 is larger than the gap S2 in the X direction between the side plate portion 36 and the connecting plate portion 26. Therefore, as described above, when the actuator 1 is driven in the second drive mode, the connecting plate portion 26 collides with the side plate portion 36 through the buffer material 9 before the yoke 17 collides with the coil holder 11, whereby the impulsive force is generated.

That is, regarding the yoke 17, the end portion on the Y1 side of the first flat-plate portion 25 and the end portion on the Y1 side of the first flat-plate portion 25 are disposed between the side plate portion 44 and the side plate portion 45 of the coil holder 11. Also, the end portion on the Y2 side of the first flat-plate portion 25 portion and the end portion on the Y2 side of the second flat-plate portion 27 are disposed between the side plate portion 47 and the side plate portion 48 of the coil holder 11. Therefore, the side plate portions 44, 45, 47, and 48 of the coil holder 11 are opposed to the first flat-plate portion 25 and the second flat-plate portion 27 in the X direction, but the gap between these opposing spots is larger than the gap S2 in the X direction between the side plate portion 36 and the connecting plate portion 26.

Moreover, as shown in FIG. 3, the plate portion 40 of the coil holder 11 is disposed inside the X direction of the pair of connecting plate portions 26, but the gap in the X direction between the plate portion 40 and the connecting plate portion 26 is larger than the gap S2 in the X direction between the side plate portion 36 and the connecting plate portion 26. Furthermore, in this embodiment, the end surfaces on the both sides in the X direction of the plate portion 40 are covered by the bent plate portion 66 of the first plate 12 and the bent plate portion 68 of the second plate 13, but the gap in the X direction between the bent plate portions 66 and 68 and the connecting plate portion 26 is larger than the gap S2 in the X direction between the side plate portion 36 and the connecting plate portion 26. Therefore, the connecting plate portion 26 collides with the side plate portion 36 through the buffer material 9 before the connecting plate portion 26 collides with the bent plate portions 66 and 68.

If the second amplitude W2 is smaller than the gap S2 between the side plate portion 36 and the connecting plate portion 26, the gap in the X direction between the yoke 17 and the coil holder 11 only needs to be such a dimension that is smaller than the second amplitude W2. If the gap in the X direction between the yoke 17 and the coil holder 11 is smaller than the second amplitude W2, the yoke 17 will not collide with the coil holder 11.

Main Effects of Present Embodiment

As described above, the actuator 1 of this embodiment has the movable body 5, the support body 3 including the case 2 that accommodates the movable body 5, the connecting bodies 6, 7 connected to the movable body 5 and the support body 3, the magnetic drive circuit 8 including the coil 10 and the first magnet 21 and the second magnet 22 opposed to the coil 10 in the Z direction (first direction) and causing the movable body 5 to vibrate in the X direction (second direction) that intersects the Z direction (first direction) with respect to the support body 3, and the buffer material 9 fixed to the case 2 and opposed the movable body 5 in the X direction (second direction).

According to this embodiment, the buffer material 9 is disposed at a position where the movable body 5 and the support body 3 are opposed to each other in the X direction (second direction), which is a vibration direction of the movable body 5. Therefore, by driving the magnetic drive circuit 8 with a large voltage so that the movable body 5 moves rapidly and largely and collides with the buffer material 9 with large acceleration, the impact can be applied to the support body 3 through the buffer material 9. Therefore, this allows the user to experience the impulsive force (feeling of being hit by the object). Also, since the movable body 5 does not directly collide with the support body 3 but collides through the buffer material 9, deformation or damage of the support body 3 can be suppressed.

In this embodiment, the buffer material 9 is fixed to the case 2, but a configuration in which the buffer material 9 is fixed to the movable body 5 may be adopted. In other words, in this embodiment, since the buffer material 9 is fixed to the side plate portion 36 of the case 2, a configuration in which the buffer material 9 is fixed to the connecting plate portion 26 opposed to the side plate portion 36 may be adopted instead of fixing the buffer material 9 to the side plate portion 36.

In this embodiment, the case 2 is made of metal. Therefore, since the strength of the case 2 is high, deformation or breakage of the case 2 due to the generation of the impulsive force can be suppressed.

In this embodiment, when the drive voltage of the magnetic drive circuit 8 is the first voltage capable of continuous drive (the first drive mode), the amplitude of the movable body 5 in the X direction (the second direction) is the first amplitude W1, and when the drive voltage of the magnetic drive circuit 8 is the second voltage (second drive mode) that causes the coil 10 to burn out in the case of continuous drive, the amplitude of the movable body 5 in the X direction (second direction) is the second amplitude W2. Each of the voltages is set such that the gap S1 between the movable body 5 and the buffer material 9 is larger than the first amplitude W1 and smaller than the second amplitude W2. Therefore, in the first drive mode, the movable body 5 can be continuously vibrated without colliding with the support body 3. In the second drive mode, the movable body 5 can be driven instantaneously with large acceleration so as to generate an impulsive force.

In this embodiment, the support body 3 includes the coil holder 11 that holds the coil 10, and the coil holder 11 includes the plate portion 40 in which the coil placement hole 41 is provided. The movable body 5 includes the yoke 17 that holds the first magnet 21 and the second magnet 22, and the yoke 17 includes the first flat-plate portion 25 opposed to the plate portion 40 from the Z1 direction (one side of the first direction), the second flat-plate portion 27 opposed to the plate portion 40 from the Z2 direction (the other side of the first direction), and the pair of connecting plate portions 26 disposed on the both sides in the X direction (second direction) of the plate portion 40. The case 2 includes the pair of side plate portions 36 that are disposed on the both sides in the X direction (second direction) of the yoke 17, and the buffer material 9 is fixed to each of the pair of side plate portions 36. Therefore, when the movable body 5 moves in either one of the one side and the other side of the X direction (second direction), the yoke 17 collides with the side plate portion 36 through the buffer material 9 and thus, an impulsive force can be generated.

In this embodiment, the coil holder 11 is made of resin, and the gap between the coil holder 11 and the yoke 17 in the X direction (second direction) is larger than the gap S2 between the side plate portion 36 and the connecting plate portion 26 in the X direction (second direction). In other words, as described above, the gap between the side plate portions 44, 45, 47, and 48 and the first flat-plate portion 25, and the gap between the side plate portions 44, 45, 47, and 48 and the second flat-plate portion 27 are both larger than the gap S2 between the side plate portion 36 and the connecting plate portion 26. Moreover, the gap between the plate portion 40 of the coil holder 11 and the connecting plate portion 26 and the gap between the bent plate portions 66 and 68 covering the end surface of the plate portion 40 and the connecting plate portion 26 are both larger than the gap S2 between the side plate portion 36 and the connecting plate portion 26. Therefore, when the movable body 5 is moved largely in the X direction (second direction), the movable body 5 will collide with the buffer material 9 before it collides with the coil holder 11. Therefore, since the collision of the movable body 5 with the coil holder 11, which is formed of resin, can be avoided, deformation or breakage of the coil holder 11 can be suppressed.

In this embodiment, the buffer material 9 is made of rubber or a foamed body. By disposing an elastic body such as rubber or a foamed body on a surface with which the movable body 5 collides, breakage or deformation of the collision point can be suppressed. Moreover, the acceleration of the movable body 5 can be damped by elastic resilience of the elastic body.

What is claimed is:

1. An actuator comprising:
    a movable body;
    a support body with a case to accommodate the movable body;
    a connecting body that is connected to the movable body and the support body;
    a magnetic drive circuit including a coil and a magnet that is opposed to the coil in a first direction and causing the movable body to vibrate in a second direction that intersects the first direction with respect to the support body; and
    a buffer material fixed to one of the case and the movable body and is opposed to the other of the case and the movable body in the second direction,
    wherein
        when a drive voltage of the magnetic drive circuit is a first voltage capable of continuous drive, an amplitude in the second direction of the movable body is a first amplitude,
        when the drive voltage of the magnetic drive circuit is a second voltage that causes the coil to burn out in the case of continuous drive, the amplitude in the second direction of the movable body is a second amplitude, and
        a gap between the movable body and the buffer material is larger than the first amplitude and smaller than the second amplitude.

2. The actuator according to claim 1, wherein the case is made of metal.

3. The actuator according to claim 1, wherein the buffer material is made of rubber or a foamed body.

4. The actuator according to claim 1, wherein the support body includes a coil holder to hold the coil, the coil holder including a plate portion with a coil placement hole,
    the movable body includes a yoke to hold the magnet,
    the yoke includes a first flat-plate portion opposed to the plate portion from one side of the first direction, a second flat-plate portion opposed to the plate portion from the other side of the first direction, and a pair of connecting plate portions disposed on both sides in the second direction of the plate portion,
    the case includes a pair of side plate portions disposed on both sides in the second direction of the yoke, and
    the buffer material is fixed to each of the pair of side plate portions.

5. The actuator according to claim 4, wherein the coil holder is made of resin, and a gap in the second direction between the coil holder and the yoke is larger than a gap in the second direction between the side plate portion and the connecting plate portion.

* * * * *